No. 874,148. PATENTED DEC. 17, 1907.
G. W. WINTERS.
BUTTER SEPARATOR.
APPLICATION FILED JULY 2, 1907.

2 SHEETS—SHEET 1.

Witnesses

Inventor
G. W. Winters,

By
Attorneys

No. 874,148. PATENTED DEC. 17, 1907.
G. W. WINTERS.
BUTTER SEPARATOR.
APPLICATION FILED JULY 2, 1907.
2 SHEETS—SHEET 2.
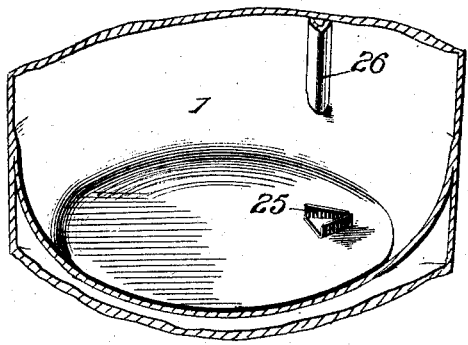
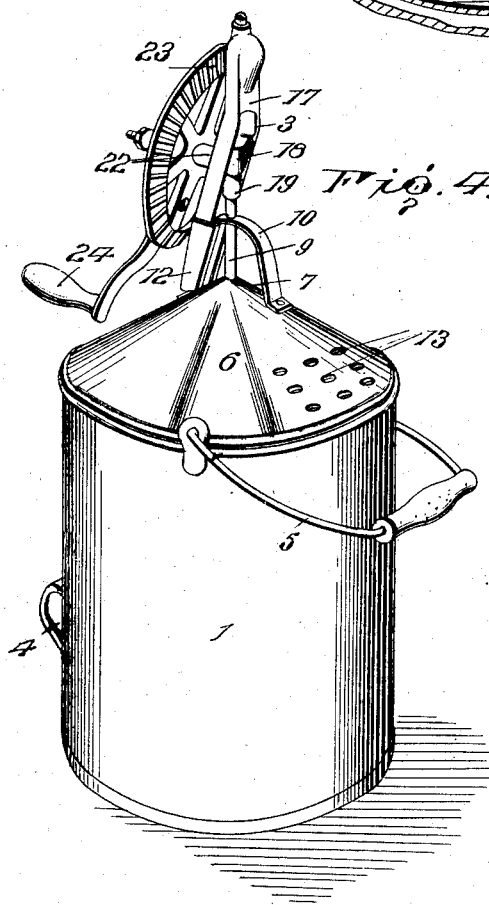
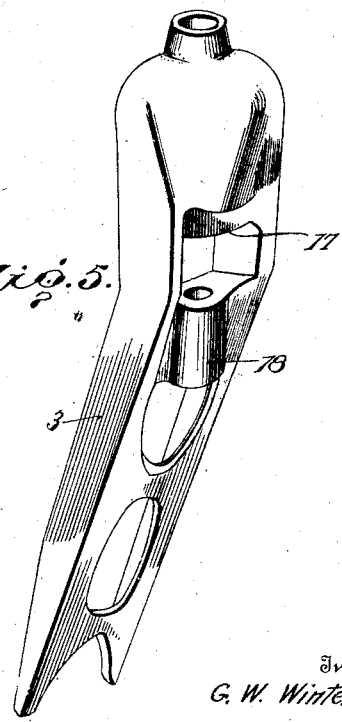
Inventor
G. W. Winters.
Witnesses
By
Attorneys
THE NORRIS PETERS CO., WASHINGTON, D. C.

UNITED STATES PATENT OFFICE.

GEORGE W. WINTERS, OF DE QUEEN, ARKANSAS.

BUTTER-SEPARATOR.

No. 874,148.　　　　Specification of Letters Patent.　　　　Patented Dec. 17, 1907.

Application filed July 2, 1907. Serial No. 381,833.

*To all whom it may concern:*

Be it known that I, GEORGE W. WINTERS, a citizen of the United States, residing at De Queen, in the county of Sevier and State of Arkansas, have invented certain new and useful Improvements in Butter-Separators, of which the following is a specification.

This invention appertains to butter manufacture and more particularly to the means for effecting separation of the butter globules or fat from the milk, the purpose being to devise a mechanism operating by centrifugal action to throw the cream outward against the sides of a receptacle with such force and velocity as to effect rapid separation and collection of the butter particles.

The invention consists of novel actuating means adapted to be shifted from one position to another with reference to the receptacle to admit of the dasher operating either at a central point or to one side of the center according to the result to be attained.

For a full understanding of the invention and the merits thereof and also to acquire a knowledge of the details of construction and the means for effecting the result, reference is to be had to the following description and accompanying drawings.

Figure 1:
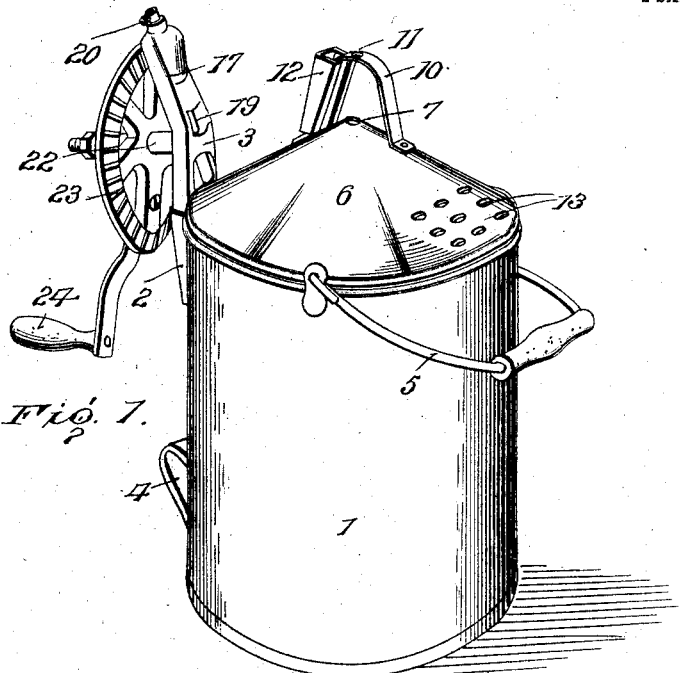
Figure 2:
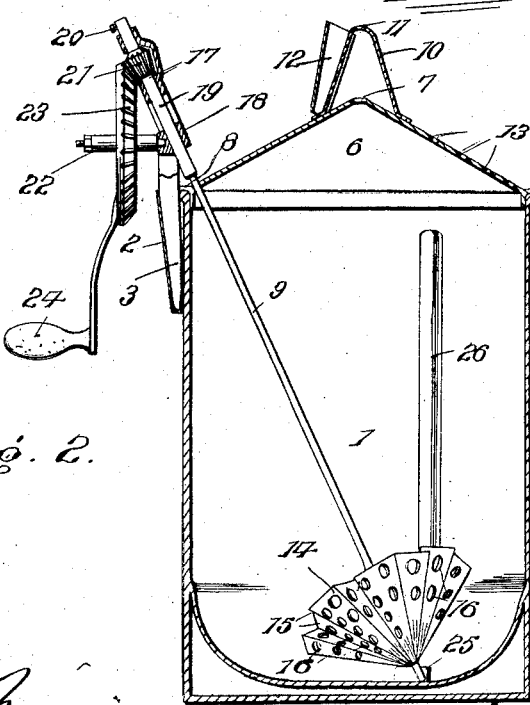

While the invention may be adapted to different forms and conditions by changes in the structure and minor details without departing from the spirit or essential features thereof, still the preferred embodiment is shown in the accompanying drawings, in which:

Figure 1 is a perspective view of a butter separating mechanism embodying the invention. Fig. 2 is a vertical central section thereof. Fig. 3 is a detail perspective view of the lower portion of the receptacle, the dasher and operating mechanism being removed. Fig. 4 is a perspective view showing the operating mechanism occupying a position for driving the dasher when arranged at a central point. Fig. 5 is a detail perspective view of the frame of the operating mechanism.

Corresponding and like parts are referred to in the following description and indicated in all the views of the drawings by the same reference characters.

The receptacle 1 for receiving the milk or cream to be churned is preferably of cylindrical form and its bottom upon the inner side is made rounding or sloping to more readily direct the currents from the sides toward the center when the machine is in operation. The socket 2 is provided at one side of the receptacle near the upper end thereof to receive the frame 3 supporting the operating mechanism, said socket being tapered to receive the lower end of the frame 3 which is correspondingly tapered to insure a tight fit of the frame in the socket when the parts are assembled. A hand grip 4 is provided at one side of the receptacle near the bottom for convenience when tilting the receptacle to pour off the contents. A bail 5 applied to the receptacle enables the same to be conveniently carried or handled.

The cover 6 for closing the upper end of the receptacle is preferably of conical form and is provided at its apex with an opening 7 and at one side with a notch 8, both providing for the passage of the dasher shaft 9 according to its position. A handle 10 is secured to the central portion of the cover and is provided at a middle point with an opening 11 through which the dasher shaft 9 is adapted to pass and at one side with a socket 12 corresponding in form to the socket 2 and adapted to receive the frame 3 when the latter is arranged to operate the dasher when occupying a central position within the receptacle. A side portion of the cover is formed with a series of small openings 13 providing in effect a strainer to separate the butter from the liquid when pouring the same from the receptacle after the churning operation.

The agitator, dasher or churning device 14 is formed of a plate having a conical form and provided at its sides with crimps forming flights or wings which engage with the milk or cream in the operation of the machine and impart a whirling motion thereto. The dasher 14 is preferably constructed of a sheet metal disk crimped or fluted about a central point, thereby giving to the device a conical form and providing the flights 15 which are essential to engage with the milk or cream and set the same in motion. The crimps or flights 15 increase in depth and width from a central point towards the upper outer edge of the dasher and the sides thereof are formed with openings 16 to provide for ingress and egress of the cream or contents of the receptacle in the operation of the machine. When the dasher is set in motion, the flights 15 engage with the cream and direct the same around in a circular path, producing a vortex since the liquid mass is caused to whirl. The upper portion of the mass is thrown outward by centrifugal action of the flights, thereby dashing the mass against the sides of the receptacle and the vacuum thus created produces a suction at the vortex, thereby causing the milk or cream to enter at the lower end or apex of the dasher. It will thus be seen that the liquid mass receives a three-fold movement, the one in a circular direction, the second outward against the sides of the receptacle, and the third away from said sides or towards the axis of rotation of the dasher. These two forces, namely, the centrifugal and the centripetal action, produce a circulatory movement of the mass about at a right angle to its rotation, with the dasher about its shaft 9 as an axis.

When the dasher is arranged to operate with its major portion to one side of the vertical or longitudinal axis of the receptacle, there is a tendency to throw the mass more to one side of the receptacle than to the other, and this is advantageous in quick churning or separation of the butter particles, but should there be a tendency of the cream to rise, the dasher is arranged centrally of the receptacle, thereby retarding the rising action of the cream, this being shown in Fig. 4. It is observed that the crimps or flights 15 are of V-form and the openings in one side thereof are in excess of the openings in the opposite side, the latter being arranged to the front with reference to the direction of rotation and the side having the greater number of openings being arranged to the rear with reference to the direction of rotation of the dasher. The dasher is reinforced at the apex in order to provide a substantial and firm connection between it and the dasher shaft.

The frame 3 supporting the operating mechanism is deflected between its ends, the lower portion being tapered to fit snugly within either of the sockets 2 or 12 and the upper portion having bearings 17 and 18 in which a hollow shaft 19 is mounted and in which the dasher shaft 9 is displayed and secured in the adjusted position by means of a set screw 20. The upper bearing 17 is chambered upon one side to form a housing in which is fitted a pinion 21, the same being secured to the hollow shaft 19 between the separate portions of said bearing 17. The protected side of the bearing 17 faces inward or toward the dasher shaft 9 to prevent any oil passing from the pinion 21 to said dasher shaft. A spindle 22 projects outward from the lower bearing 18 and receives a drive gear 23 which is mounted thereon and meshes with the pinion 21, said drive gear being provided with a crank handle 24 to admit of operating the machine by hand.

The milk or cream to be churned is placed in the receptacle 1 which is closed by means of the cover 6. The frame 3 with the operating mechanism may be fitted to either the socket 2 or the socket 12 and the dasher shaft 9, after being slipped into the hollow shaft 19 and secured therein at the adjusted position, is rotated by the mechanism herein disclosed. When the dasher occupies a central position, its shaft 9 passes through the opening 7 of the cover and the opening 11 of the handle 10. When the frame 3 is fitted in the socket 2, the dasher 9 passes through the notch 8 in the side of the cover and its lower end is fitted in a guide 25 applied to the bottom of the receptacle and of V-form, thereby steadying and fixing the position of the dasher which is essential because of the unequal distribution of the load thereon resulting from the throwing of the mass in the receptacle more to one side thereof than the other.

The dasher may be adjusted to any level within the receptacle by moving the shaft 9 in the hollow shaft 19 and securing it in the adjusted position by means of the set screw 2.

As the dasher is rotated, a whirling motion is imparted to the milk or cream, with the result that a vortex is created, the upper portion of the mass being thrown outward and the lower portion drawn inward. In order to increase the agitation, a rib 26 extends along the inner side of the receptacle 1 and forms a brake bar against which the mass is dashed, thereby assisting materially in the separation or churning operation.

Having thus described the invention, what is claimed as new is:

1. A rotary dasher for the purpose specified formed of a disk of sheet material crimped about a central point to provide a series of V-shaped flights and to give to the dasher an approximately conical form, said flights having openings in opposite sides, the openings in one side being in excess of those in the other side.

2. In a machine of the character set forth, the combination of a receptacle having a socket, a frame removably fitted in the socket and having bearings and an offstanding spindle, a hollow shaft mounted in bearings and provided with a pinion, a drive gear mounted upon said spindle and in mesh with said pinion, and a dasher having its shaft adjustable in the aforesaid hollow shaft adapted to be secured therein at an adjusted position.

3. A machine of the character specified, comprising a receptacle having a socket upon its side near its upper end, a cover having a central opening, a handle fitted to the cover and having an opening in line with the central opening formed in said cover and provided at one side with a socket corresponding to the socket of the receptacle, a frame adapted to be fitted in either one of said sockets and provided with operating mechanism, and a rotary dasher adapted to be adjustably fitted to the said frame to be driven by the operating mechanism.

4. In a machine of the character specified, the combination of a receptacle having a sloping bottom and a guide to one side of the center, a socket fitted to a side of the receptacle near the upper end thereof and at a point diametrically opposite to the guide of said bottom, a frame fitted in said socket and provided with operating mechanism, and a dasher adapted to be adjustably fitted to said frame and passing through the receptacle at an inclination and having its lower end fitted in the aforesaid guide, the parts being arranged to operate substantially in the manner specified.

In testimony whereof I affix my signature in presence of two witnesses.

GEORGE W. WINTERS. [L. S.]

Witnesses:
   C. MALLORY,
   R. H. WOOD.